US010441113B2

(12) United States Patent
Leppert et al.

(10) Patent No.: US 10,441,113 B2
(45) Date of Patent: Oct. 15, 2019

(54) BLENDER JAR LID WITH TORTUOUS AIRFLOW PATH

(71) Applicant: Hamilton Beach Brands, Inc., Glen Allen, VA (US)

(72) Inventors: Kevin L Leppert, Lanexa, VA (US); Justin Kyle Dickerson, Goochland, VA (US); Joseph R Elliott, Henrico, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 142 days.

(21) Appl. No.: 15/723,792

(22) Filed: Oct. 3, 2017

(65) Prior Publication Data

US 2019/0099042 A1  Apr. 4, 2019

(51) Int. Cl.
| | |
|---|---|
| *A47J 43/07* | (2006.01) |
| *A47J 43/046* | (2006.01) |
| *B01F 15/00* | (2006.01) |
| *A47J 31/44* | (2006.01) |
| *A47J 36/06* | (2006.01) |

(52) U.S. Cl.
CPC ....... *A47J 43/0716* (2013.01); *A47J 31/4407* (2013.01); *A47J 43/046* (2013.01); *B01F 15/00779* (2013.01); *A47J 36/06* (2013.01); *B01F 2215/0026* (2013.01)

(58) Field of Classification Search
CPC .. A47J 43/046; A47J 43/0716; A47J 31/4407; A47J 36/06; B01F 15/00779; B01F 2215/0026
See application file for complete search history.

(56) References Cited

U.S. PATENT DOCUMENTS

| | | | | |
|---|---|---|---|---|
| 1,446,709 A | * | 2/1923 | Leyse ................ | A47J 31/4407 220/301 |
| 1,721,812 A | * | 7/1929 | Gardella ............. | A47J 31/4407 220/377.1 |
| 1,795,449 A | * | 3/1931 | Seghers .............. | A47J 31/4407 220/377.1 |
| 3,892,365 A | * | 7/1975 | Verdun ................ | A47J 43/06 241/282.1 |
| 4,087,053 A | * | 5/1978 | Voglesonger ........ | A47J 43/046 241/282.1 |
| 4,396,159 A | * | 8/1983 | Podell ................. | A47J 43/046 241/37.5 |
| 5,526,949 A | * | 6/1996 | Carey ................. | A47J 43/0727 215/329 |
| 5,944,211 A | * | 8/1999 | Woodnorth ........ | B65D 81/2038 220/203.13 |

(Continued)

FOREIGN PATENT DOCUMENTS

WO  WO 2017/014658 A1 *  1/2017

*Primary Examiner* — Tony G Soohoo
(74) *Attorney, Agent, or Firm* — Alexander D. Raring (57) ABSTRACT

A blender for blending foodstuff comprises a base enclosing a motor, a jar for containing foodstuff that is removably mountable to the base, and a lid removably mountable to the jar to selectively close off the top end. The lid comprises a main body having an opening defined therein, and a cap removably mountable to the main body to selectively close off the opening. When the cap is mounted to the main body and the lid is mounted to the jar, a tortuous airflow path is provided between the main body and cap to allow airflow into or out of the jar.

5 Claims, 11 Drawing Sheets

(56) References Cited

U.S. PATENT DOCUMENTS

| | | | | |
|---|---|---|---|---|
| 6,637,681 | B1 * | 10/2003 | Planca | A47J 43/046 241/37.5 |
| 6,910,800 | B2 * | 6/2005 | Wu | A47J 43/0727 241/282.1 |
| D534,394 | S * | 1/2007 | Zhiwen | D7/378 |
| D543,072 | S * | 5/2007 | Ting | D7/378 |
| D550,507 | S * | 9/2007 | Picozza | D7/413 |
| 7,407,320 | B1 * | 8/2008 | Lin | A47J 43/0777 241/37.5 |
| 7,530,510 | B2 * | 5/2009 | Newman | A47J 43/044 241/37.5 |
| 8,157,435 | B2 * | 4/2012 | Pryor, Jr. | A47J 43/0727 241/282.1 |
| 8,403,556 | B2 * | 3/2013 | Wu | A47J 43/0777 241/37.5 |
| D738,670 | S * | 9/2015 | Sands | D7/317 |
| D738,685 | S * | 9/2015 | Sands | D7/376 |
| 9,555,384 | B2 * | 1/2017 | Haney | B01F 7/00291 |
| 9,751,054 | B2 * | 9/2017 | Jin | A47J 43/0465 |
| 9,895,028 | B2 * | 2/2018 | Gerard | A47J 36/06 |
| 2011/0014342 | A1 * | 1/2011 | Picozza | A47J 36/2433 426/474 |
| 2012/0213900 | A1 * | 8/2012 | Zakowski | A47J 27/04 426/509 |
| 2018/0014683 | A1 * | 1/2018 | Glucksman | A47J 27/04 |
| 2018/0140131 | A1 * | 5/2018 | Alves | A47J 36/06 |
| 2019/0099042 | A1 * | 4/2019 | Leppert | A47J 43/046 |

* cited by examiner

BLENDER JAR LID WITH TORTUOUS AIRFLOW PATH

BACKGROUND OF THE DISCLOSURE

The present disclosure relates generally to small appliances, and more particularly to blenders for blending foodstuff.

Blenders are a common household appliance and are capable of mixing liquids and chopping dry foods. Blenders are also useful for liquefying fruits and vegetables and for blending solids with liquids. A typical blender includes a blender jar that sits on top of a blender base. The blender jar has an open top end that is selectively closed off with a lid. Foodstuff is placed into the container, the lid is mounted on the blender jar, and the blender jar is engaged with the blender base. The foodstuff is blended within the volume defined by the blender jar, and the blender jar is removed from the blender base to dispense or pour the blended foodstuff.

Most lids are one-piece units, but some have a removable center portion called a cap. The cap is selectively removable to reveal a secondary opening through the lid so that additional foodstuff/liquids may be added during the blending process.

Sudden movement of the foodstuff at the start of the blending cycle can increase the air pressure within the jar. This is not an issue for one-piece lids that are secured to the jar, but it can cause the cap to separate from the lid. One or more air channels can be defined between the cap and the lid to allow air to flow in and out of the jar even when the cap and lid are in place on the jar. The air channels prevent or minimize a pressure increase in the jar.

In conventional blender lids, these air channels provide a relatively straight path between the inside and outside of the jar. Foodstuff/liquids may be undesirably expelled from the jar through the air channels during the blending operation, thereby creating a mess.

It has heretofore not been discovered how to create a blender with the desired air channels to inhibit a pressure increase in the jar without the concomitant risk of foodstuff being undesirably expelled from the jar through the air channels. The blender of the following disclosure overcomes at least one of the above-described disadvantages of conventional blenders.

BRIEF SUMMARY OF THE DISCLOSURE

A blender for blending foodstuff is disclosed herein. In one embodiment of the subject device, a blender for blending foodstuff comprises a base enclosing a motor, a jar for containing foodstuff, the jar being removably mountable to the base in an operating configuration and having an open top end for receiving foodstuff to be blended, and a lid removably mountable to the jar to selectively close off the top end. The lid comprises a main body having an opening defined therein and a cap removably mountable to the main body to selectively close off the opening. The opening is defined by a ledge projecting inwardly toward a center of the opening. The main body ledge has a peripheral portion and a central portion. The central portion is in a stepped-down arrangement from the peripheral portion and has one or more keyholes defined therein. The cap comprises (a) an outwardly extending flange, (b) a grasping portion above the cap flange, and (c) a lower wall below the cap flange. One or more air channels are defined in a bottom surface of the cap flange. The lower wall of the cap is insertable through the main body opening when the cap is mounted to the main body. When the cap is mounted to the main body, at least a portion of the bottom surface of the cap flange contacts at least a portion of a top surface of the peripheral portion of the main body ledge. Further, the bottom surface of the cap flange does not contact a top surface of the central portion of the main body ledge, such that a gap exists between the bottom surface of the cap flange and the top surface of the central portion of the main body ledge. Air can flow into or out of the jar through (1) the one or more air channels, (2) the gap between the bottom surface of the cap flange and the top surface of the central portion of the main body ledge, and (3) the one or more keyholes. When the cap is mounted to the main body, none of the one or more air channels is aligned with any of the one or more keyholes.

The central portion of the main body ledge may have two opposing keyholes defined therein. The lower wall of the cap may have two opposing outwardly projecting keys with a space defined between a top surface of each key and the bottom surface of the cap flange. The cap may be mounted to the main body by aligning each key with a corresponding keyhole, inserting each key into its corresponding keyhole, and rotating the cap such that at least a portion of the main body ledge is sandwiched between each key and the bottom surface of the cap flange. The top surface of each key may have a slope corresponding to a slope of corresponding portions of of a bottom surface of the portion of the main body ledge.

The bottom surface of the cap flange and the top surface of the peripheral portion of the main body ledge may be each generally horizontal.

The main body may further comprise a wall extending downward from the main body ledge.

In alternative embodiments of the present disclosure, a blender for blending foodstuff comprises a base enclosing a motor, a jar for containing foodstuff that is removably mountable to the base in an operating configuration, and a lid removably mountable to the jar to selectively close off an open top end of the jar. The lid comprises a main body having an opening defined therein, and a cap removably mountable to the main body to selectively close off the opening. When the cap is mounted to the main body and the lid is mounted to the jar, a tortuous airflow path is provided between the main body and cap to allow airflow into or out of the jar.

When the cap is mounted to the main body and the lid is mounted to the jar, the tortuous airflow path may cause air going into or coming out of the jar to change directions at least three times.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Figure 1:
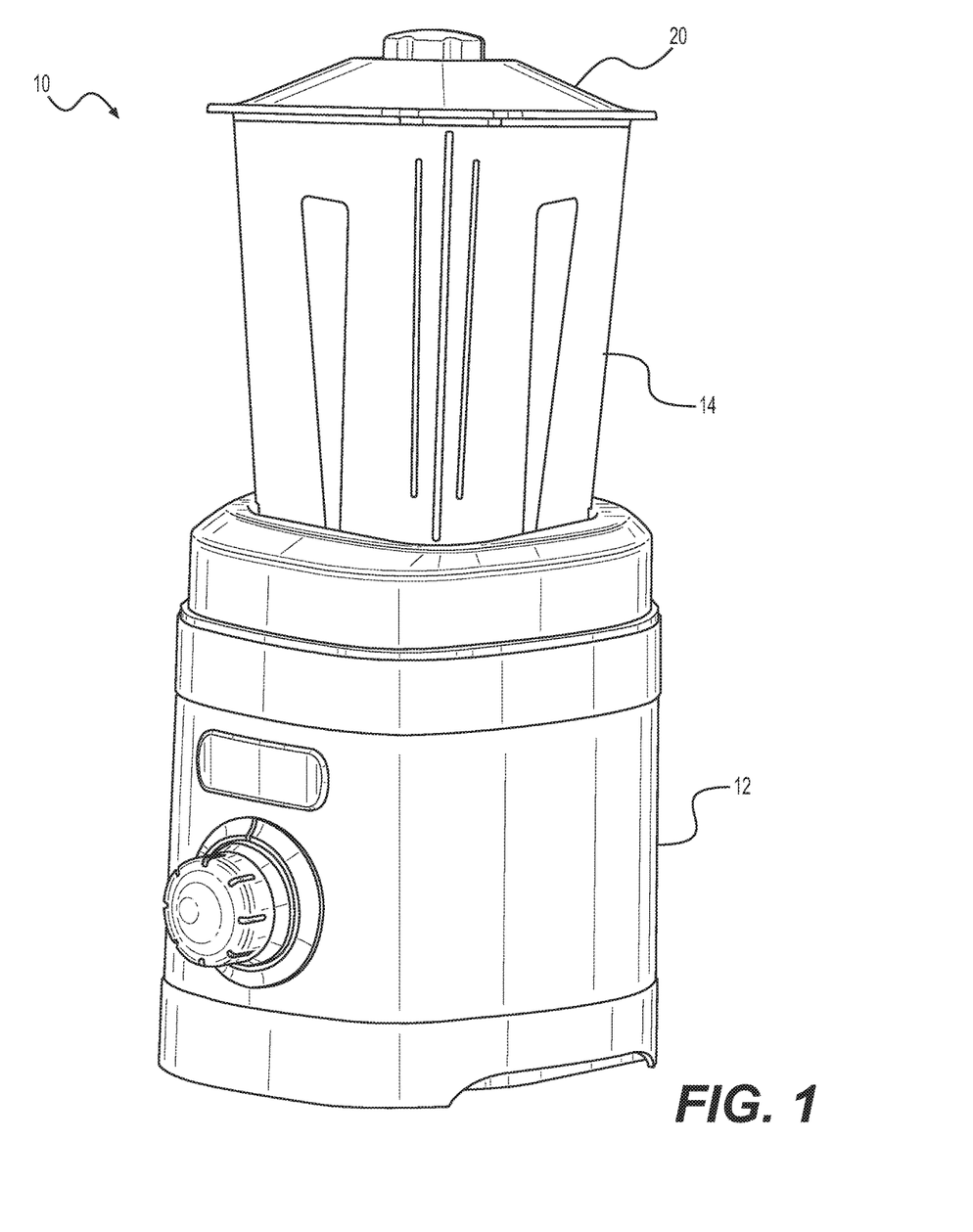
FIG. 1 is a perspective view of a blender, with its jar mounted on its base and its lid mounted on its jar, according to one embodiment of the invention.
Figure 2:
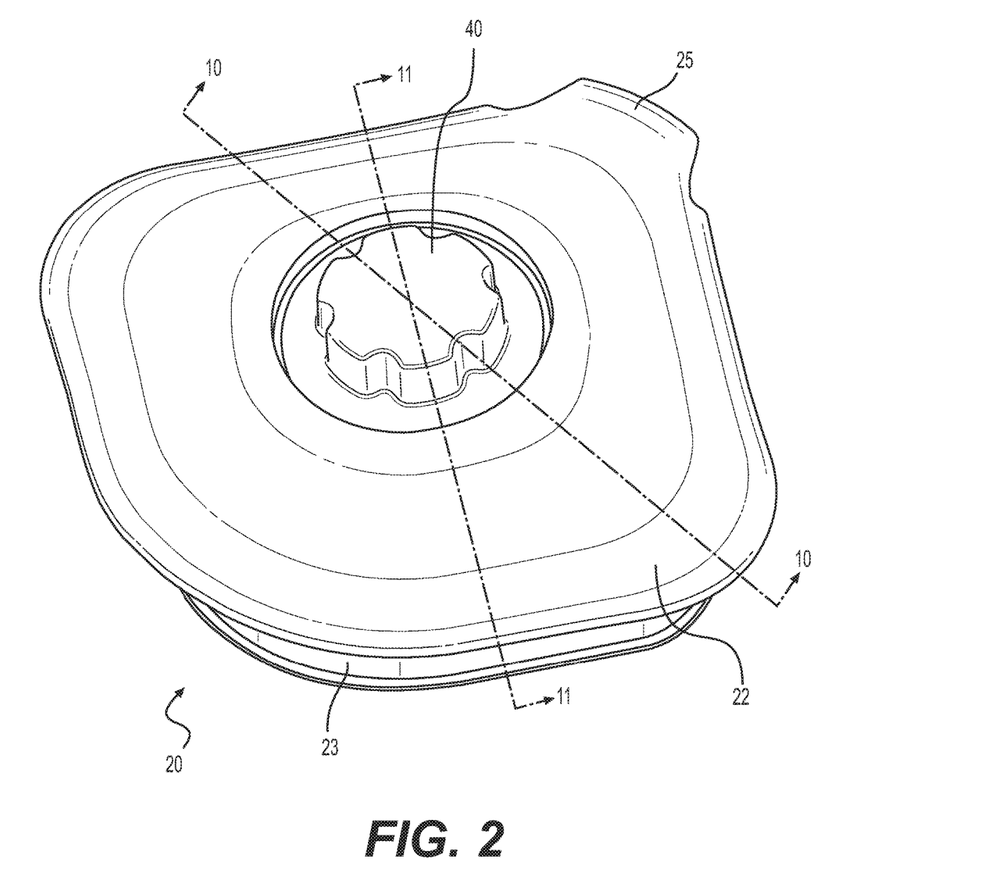
FIG. 2 is a top perspective view of the lid of the blender of FIG. 1.
Figure 3:
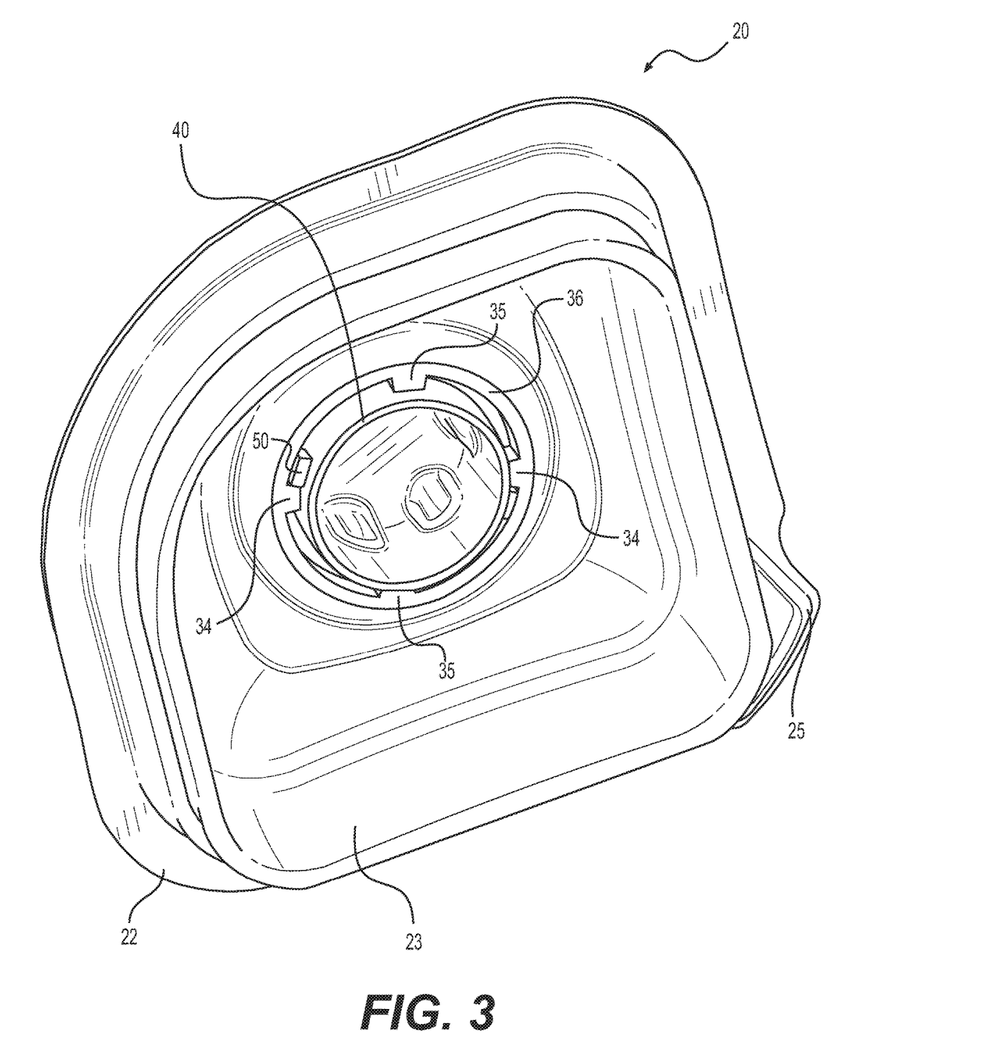
FIG. 3 is a bottom perspective view of the lid of the blender of FIG. 1.

Referring to the drawings in detail, wherein like numerals indicate like elements throughout, FIGS. 1-11 illustrate a blender or other similar mixing device in accordance with a preferred embodiment of the present disclosure. The blender 10 of embodiments of the present disclosure comprises a base 12 enclosing a motor (not illustrated) and a jar 14 for containing foodstuff to be blended. The jar 14 is removably mountable to the base 12 in an operating configuration and has an open top end for receiving foodstuff to be blended. A lid 20 is removably mountable to the jar 14 to selectively close off the top end. FIG. 1 illustrates the lid 20 selectively mounted to the jar 14, while FIGS. 2-11 illustrate the lid 20 (or components thereof) selectively removed from the jar 14.

Figure 4:
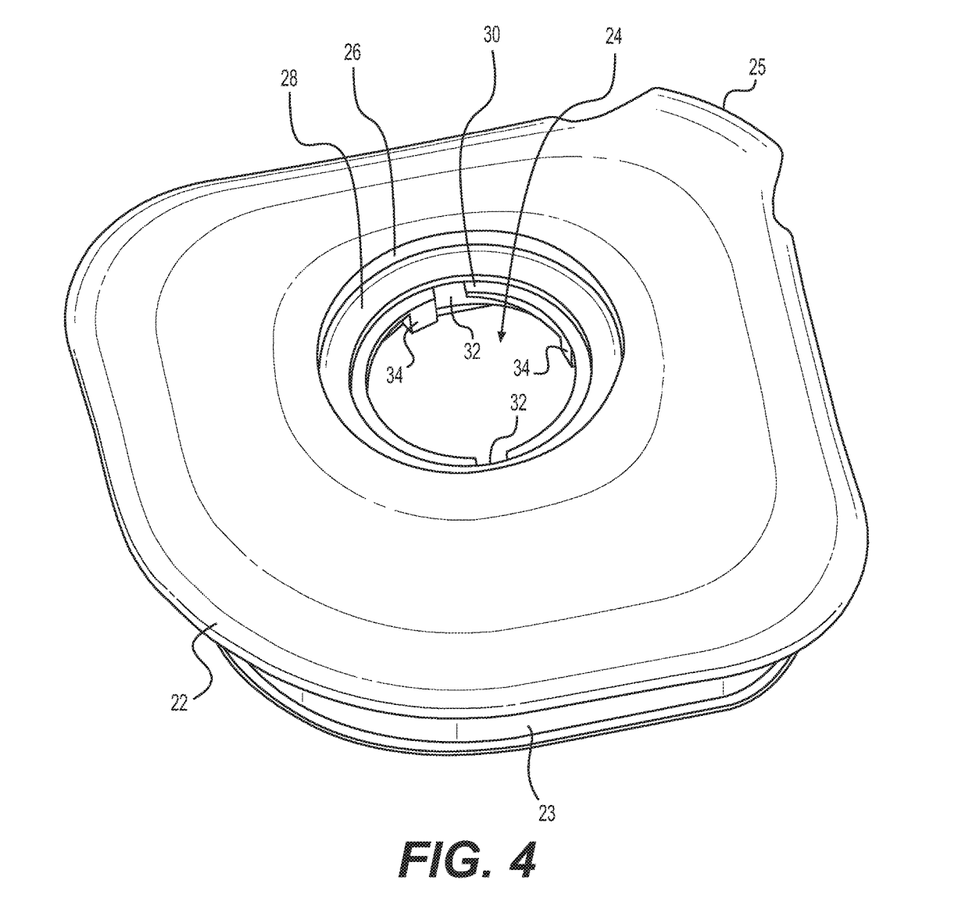
FIG. 4 is a top perspective view of the lid of the blender of FIG. 1 with its cap removed.
Figure 5:
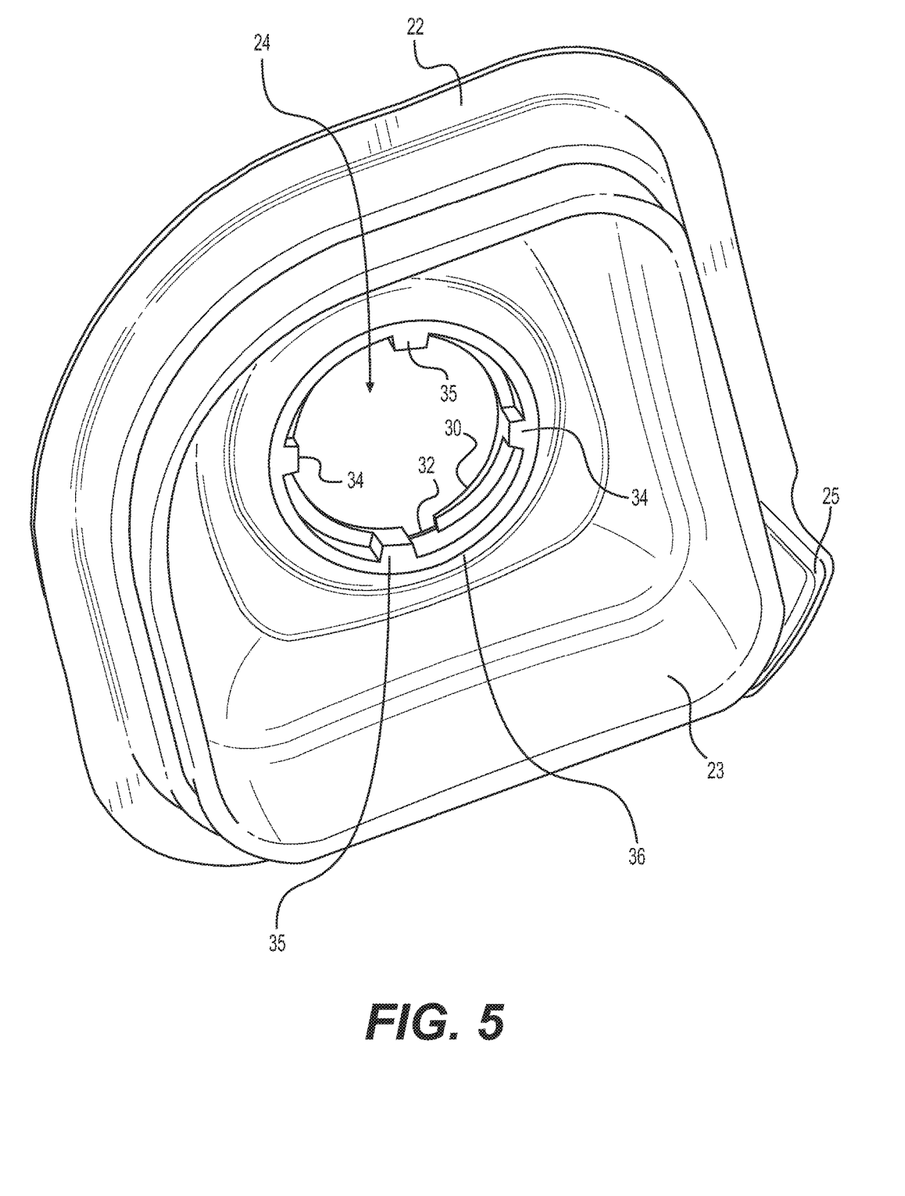
FIG. 5 is a bottom perspective view of the lid of the blender of FIG. 1 with its cap portion removed.
Figure 6:
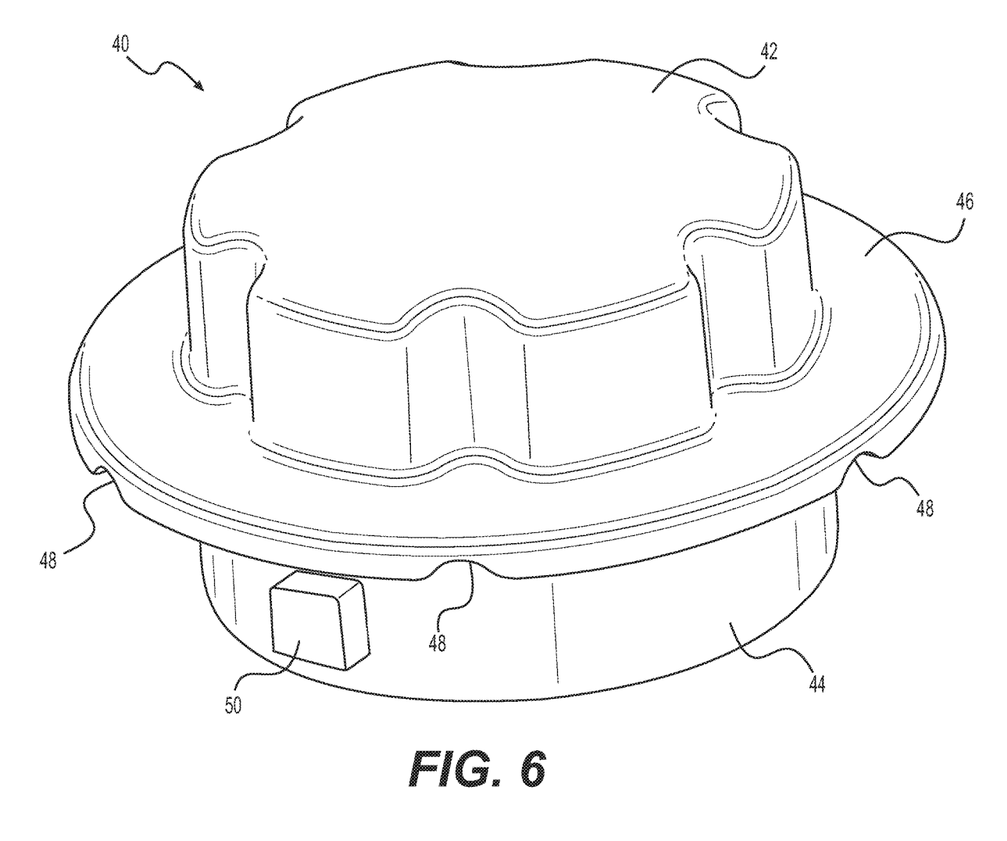
FIG. 6 is a top perspective view of the cap portion of the lid of the blender of FIG. 1 removed from the lid.
Figure 7:
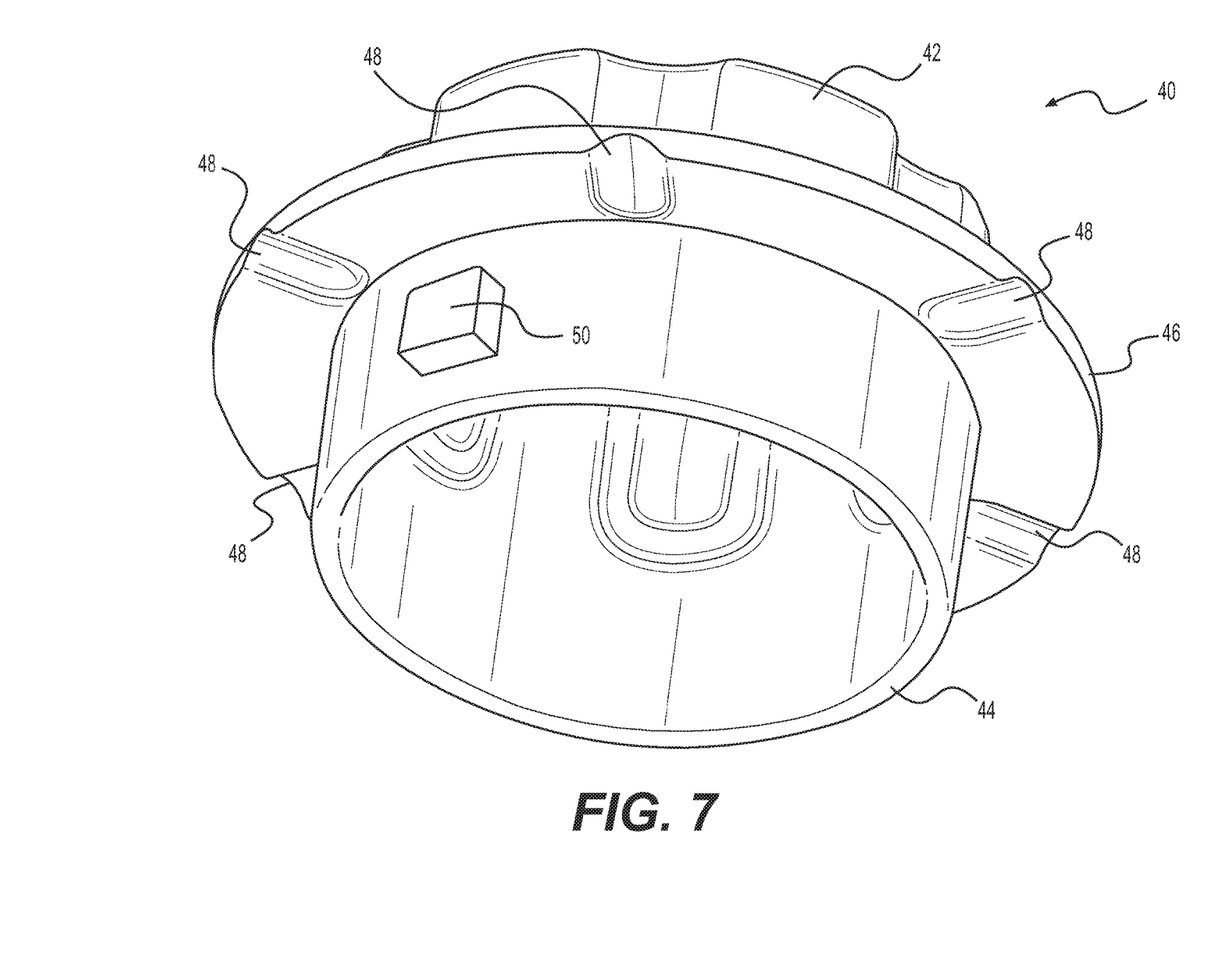
FIG. 7 is a bottom perspective view of the cap portion of the lid of the blender of FIG. 1 removed from the lid.
Figure 8:
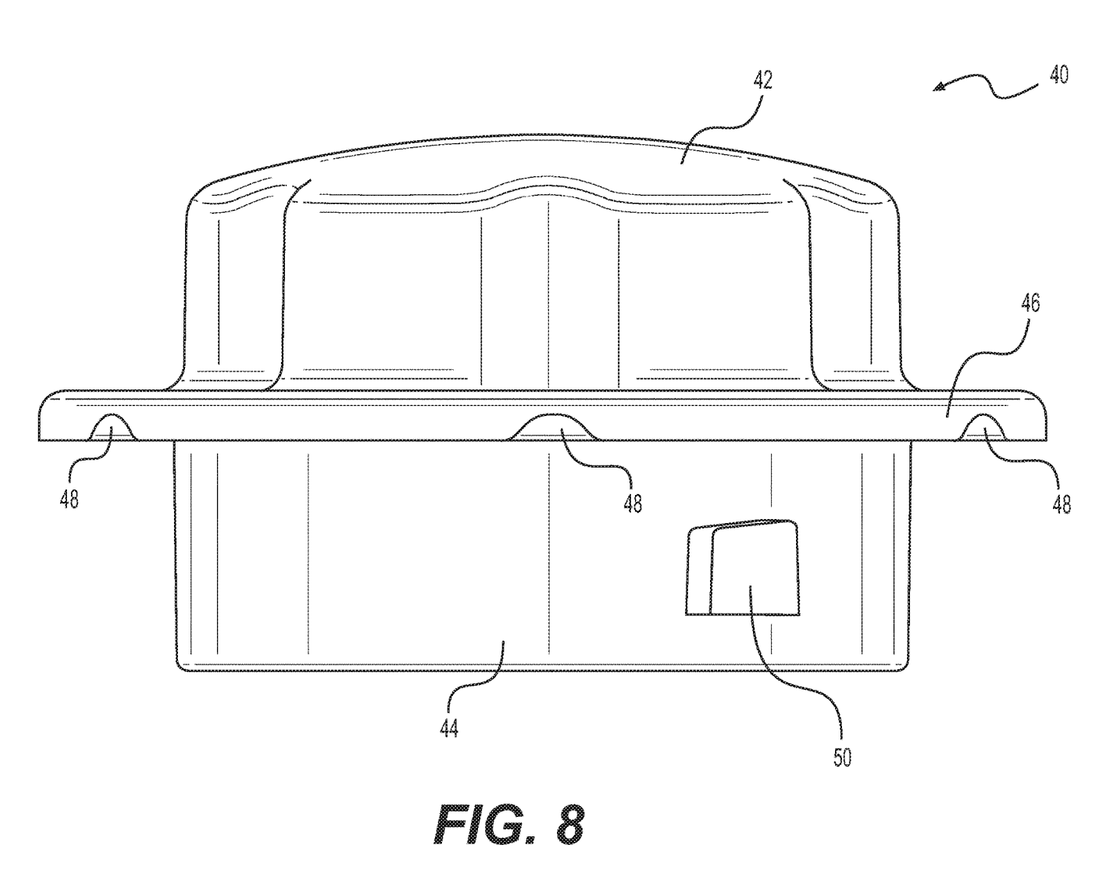
FIG. 8 is a side view of the cap portion of the lid of the blender of FIG. 1 removed from the lid.
Figure 9:
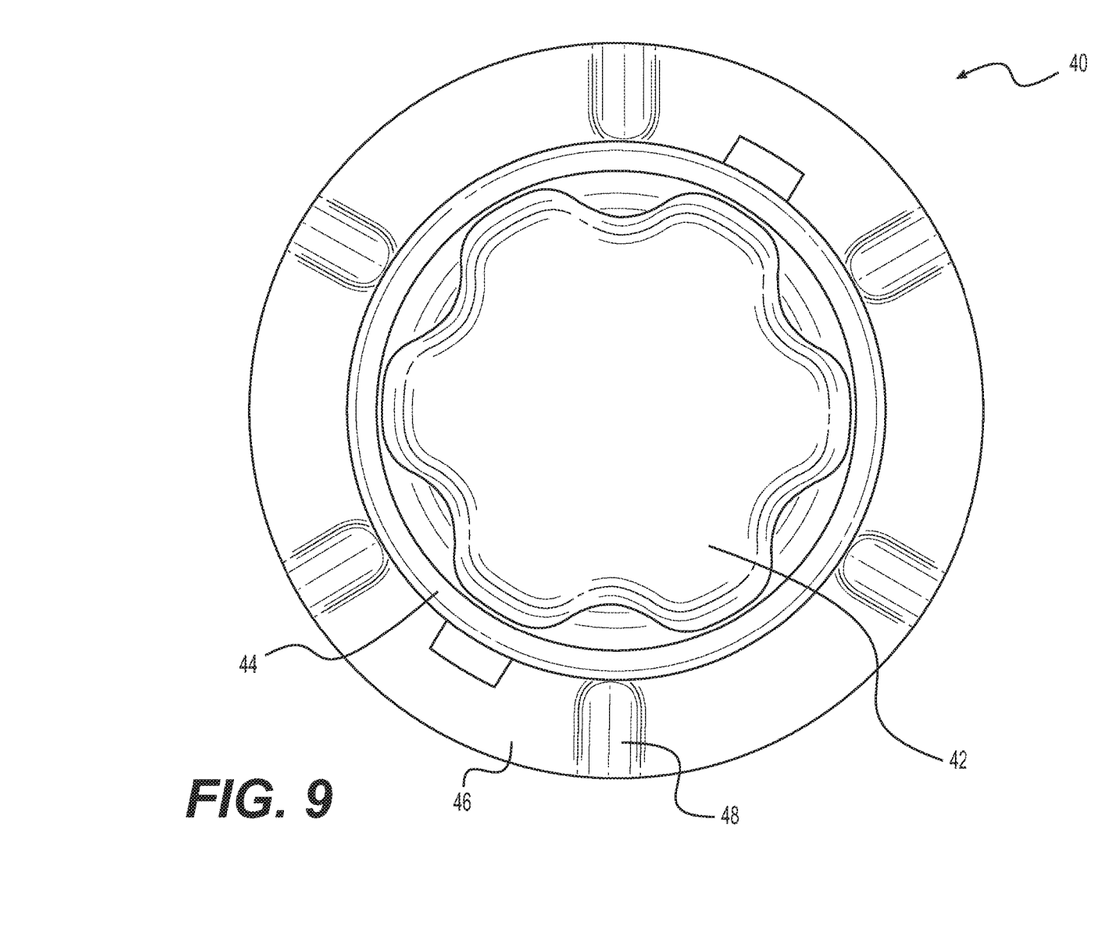
FIG. 9 is a bottom view of the cap portion of the lid of the blender of FIG. 1 removed from the lid.
Figure 10:
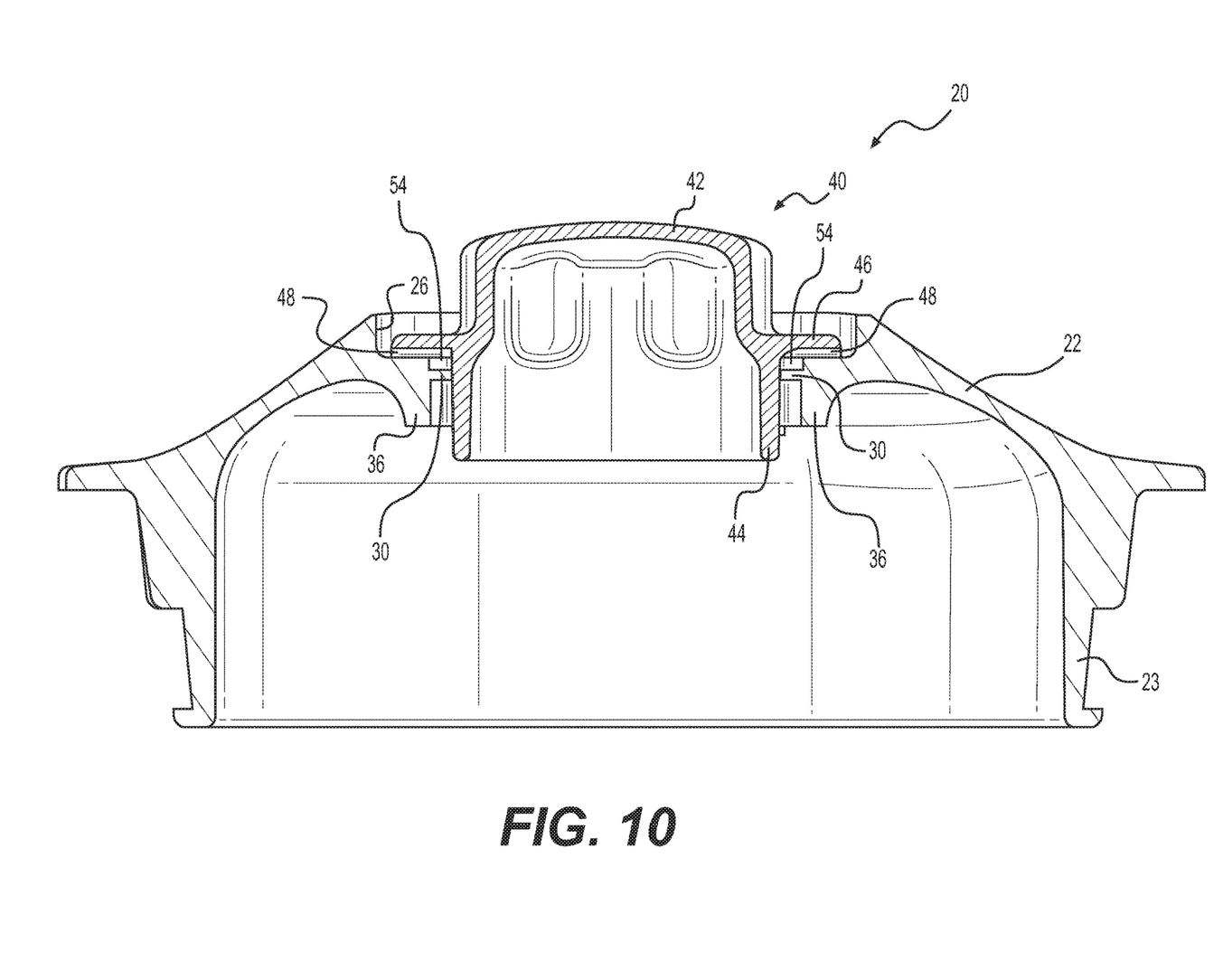
FIG. 10 is a cross-sectional view of the lid of the blender of FIG. 1 along line 10-10 of FIG. 2.
Figure 11:
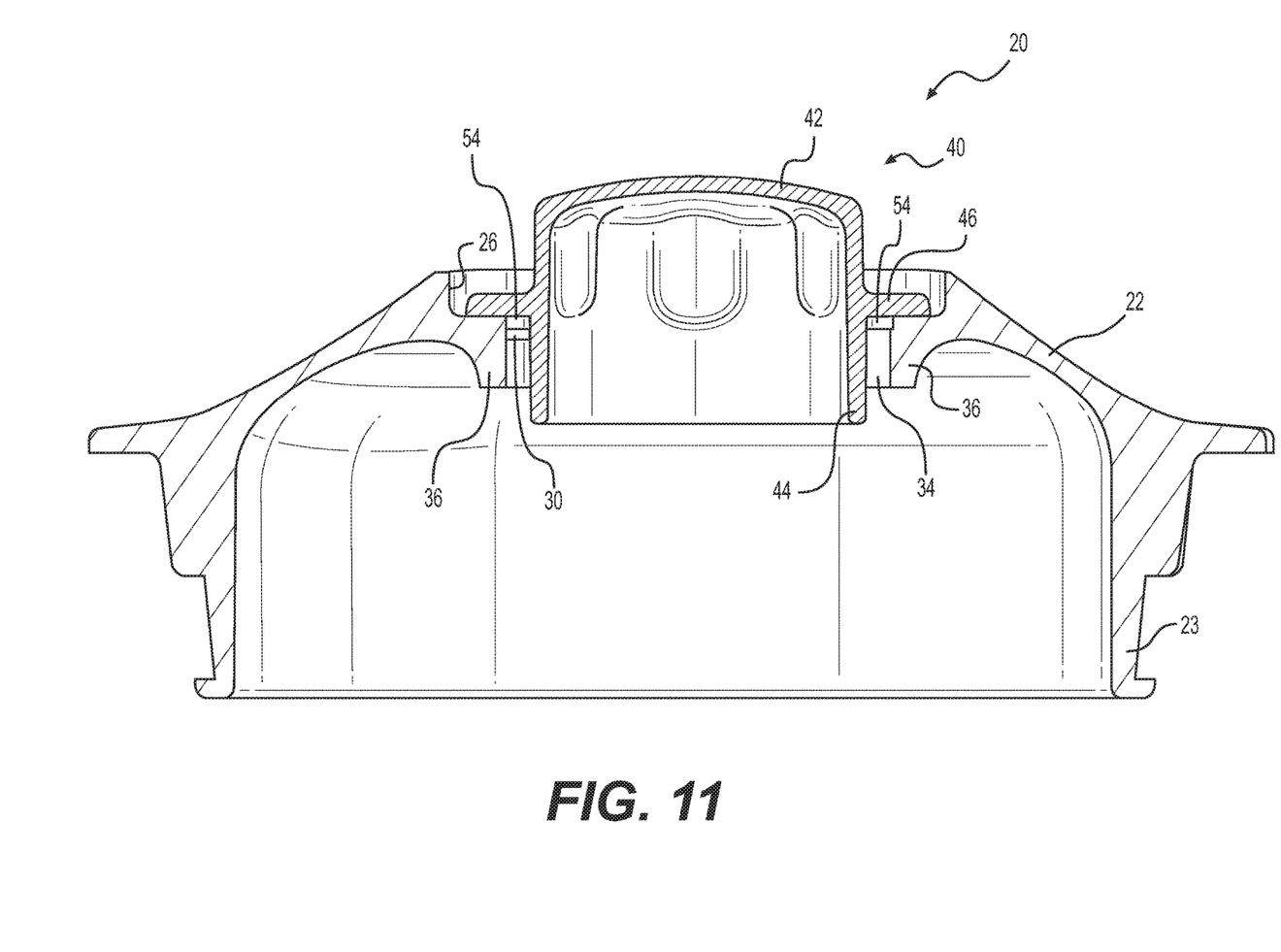
FIG. 11 is a cross-sectional view of the lid of the blender of FIG. 1 along line 11-11 of FIG. 2.

The lid 20 comprises a main body 22 having an opening 24 defined therein and a cap 40 removably mountable to the main body 22 to selectively close off the opening 24. FIGS. 2, 3, 10 and 11 illustrate the lid 20 with the cap 40 selectively mounted to the main body 22. FIGS. 4 and 5 illustrate the lid 20 with the cap 40 selectively removed from the main body 22. FIGS. 6-9 illustrate the cap 40 selectively removed from the main body 22 of the lid 20. The main body 22 typically includes a downwardly projecting skirt 23. The skirt 23 sits down in the jar 14 when the lid 20 is in place on the jar 20. The lid 20 may comprise a tab 25 or other projection to enable easier removal of the lid 20 from the jar 14.

The opening 24 is defined by a ledge projecting inwardly toward a center of the opening. The ledge has a peripheral portion 28 and a central portion 30. The peripheral portion 28 is in a stepped-down arrangement from the top of the main body 22 (forming a wall 26 that is typically substantially vertical), and the central portion 30 is in a stepped-down arrangement from the peripheral portion 28. In this regard, the ledge advantageously has two different levels (a higher level formed by the peripheral portion 28 and a lower level formed by the central portion 30), which helps form a tortuous airflow path as described below.

The cap 40 comprises an outwardly extending flange 46, a grasping portion 42 above the cap flange 46, and a lower wall 44 below the cap flange 46. Two opposing keyholes 32 are defined in the central portion 30 of the main body ledge (although fewer or more keyholes may be used). Correspondingly, the lower wall 44 of the cap 40 has two opposing outwardly projecting keys 50 with a space defined between a top surface of each key 50 and the bottom surface of the cap flange 46. The cap is mounted to the lid 20 by aligning each key 50 with a corresponding keyhole 32, inserting each key 50 into its corresponding keyhole 32 by pushing the lower wall 44 down into the opening 24, and rotating the cap 40 such that at least a portion of the main body ledge is sandwiched between each key 50 and the bottom surface of the cap flange 46. Specifically, when the cap 40 is mounted to the lid, the top surface of each key 50 contacts the bottom surface of the central portion 30 of the main body ledge, and the bottom surface of the cap flange 46 contacts the top surface of the peripheral portion 28 of the main body ledge. Because the central portion 30 is stepped down from the peripheral portion 28 of the main body ledge, the bottom surface of the cap flange 46 does not contact the central portion 30. In this regard, a gap 54 (seen in FIGS. 10 and 11) is maintained between the cap flange 46 and the central portion 30 of the main body ledge. This gap helps form the tortuous airflow path as described below. The sandwiching of a portion of the main body ledge between the keys 50 and the bottom surface of the cap flange 46 helps secure the cap 40 onto the main body 22. The bottom surface of the cap flange 46 and the top surface of the peripheral portion 28 of the main body ledge are typically generally horizontal, such that the desired contact between the two surfaces is maintained.

The top surface of each key 50 may have a slope (best seen in FIG. 8) corresponding to a slope of corresponding portions of a bottom surface of the central portion 30 of the main body ledge (the slope of the central portion 30 of the main body ledge, which produces a variable thickness, is seen in FIG. 5). As the cap 40 is rotated into place on the main body 22, the portion of the central portion 30 of the main body ledge contacting the keys 50 becomes thicker, thereby increasing the force that holds the cap 40 into position on the main body 22.

A wall 36 projects downward from the main body ledge, with a generally vertical central surface. Two pairs of opposing stop blocks 34, 35 project inward from the generally vertical central surface of the wall 36. Each one of opposing stop blocks 34 is adjacent a corresponding keyhole 32 (on the counterclockwise side of the keyhole when viewed from the top), while each one of opposing stop blocks 35 is spaced apart from a corresponding keyhole 32 adjacent a thicker portion of the central portion 30 of the main body ledge (on the clockwise side of the thicker portion of the central portion 30 when viewed from the top). When the cap 40 is rotated counterclockwise in order to remove the cap 40 from the main body 22, the keys 50 contact the stop blocks 34 when the cap 40 has been rotated to the point that the keys 50 align with the keyholes 32 and the cap 40 can be removed from the main body 22. When the cap 40 is placed on the main body 22 and rotated clockwise to secure the cap 40 to the main body 22, the keys 50 contact the stop blocks 35 when the cap 40 is fully rotated into its secured position on the main body 22.

One or more air channels 48 are defined in a bottom surface of the cap flange 46. The air channels may have any suitable number, shape, size, or spacing. In the illustrated embodiment of the present disclosure, six air channels 48 are evenly spaced about the cap flange 46. Each air channel 48 has a curved profile that results in an arcuate opening at the outer edge of the cap flange 46. Each air channel 48 extends from the outer edge of the cap flange 46 to about the lower wall 44 (and extends at least to above the central portion 30 of the main body ledge to enable the desired airflow). Importantly, when the cap 40 is fully mounted to the main body 22, none of the air channels 48 is aligned with any of the keyholes 32. If an air channel were aligned with a keyhole, such an alignment would produce an undesirable direct airflow path.

As described above, when the cap 40 is mounted to the main body 22, the bottom surface of the cap flange 46 contacts the top surface of the peripheral portion 28 of the main body ledge but does not contact the central portion 30, thereby maintaining a gap 54 between the cap flange 46 and the central portion 30 of the main body ledge. Air can flow into or out of the jar 14 through (1) the air channels 48, (2) the gap 54 between the bottom surface of the cap flange 46 and the top surface of the central portion 30 of the main body ledge, and (3) the keyholes 32. In this regard, a tortuous airflow path is provided between the main body 22 and cap 40 to allow airflow into and/or out of the jar 14. Such a tortuous airflow path may cause air going into or coming out of the jar to change directions at least three times. Specifically, air flowing into the jar flows through the air channels 48, then turns downward (first direction change) to flow into the gap 54 between the bottom surface of the cap flange 46 and the top surface of the central portion 30 of the main body ledge, then turns clockwise and/or counterclockwise (second direction change) to flow along the gap 54, and finally turns downward (third direction change) to flow through at least one of the keyholes 32. A reverse airflow path is followed for air flowing out of the jar.

Such a tortuous airflow path provides the desired airflow in and out of the blender jar while also minimizing the risk of foodstuff being expelled from the blender jar along the tortuous airflow path during the blending operation.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A blender for blending foodstuff, the blender comprising:
   (A) a base enclosing a motor;
   (B) a jar for containing foodstuff, the jar being removably mountable to the base in an operating configuration, the jar having an open top end for receiving foodstuff to be blended; and
   (C) a lid removably mountable to the jar to selectively close off the top end, the lid comprising:
      (i) a main body having an opening defined therein, the opening being defined by a main body ledge projecting inwardly toward a center of the opening, the main body ledge having a peripheral portion and a central portion, the central portion being in a stepped-down arrangement from the peripheral portion, the central portion having one or more keyholes defined therein; and
      (ii) a cap removably mountable to the main body to selectively close off the opening, the cap comprising (a) an outwardly extending cap flange, (b) a grasping portion above the cap flange, and (c) a lower wall below the cap flange, one or more air channels being defined in a bottom surface of the cap flange, the lower wall of the cap being insertable through the main body opening when the cap is mounted to the main body;
   wherein, when the cap is mounted to the main body, at least a portion of the bottom surface of the cap flange contacts at least a portion of a top surface of the peripheral portion of the main body ledge and the bottom surface of the cap flange does not contact a top surface of the central portion of the main body ledge such that a gap exists between the bottom surface of the cap flange and the top surface of the central portion of the main body ledge;
   wherein air can flow into or out of the jar through (1) the one or more air channels, (2) the gap between the bottom surface of the cap flange and the top surface of the central portion of the main body ledge, and (3) the one or more keyholes; and
   wherein, when the cap is mounted to the main body, none of the one or more air channels is aligned with any of the one or more keyholes.

2. The blender of claim 1, wherein the central portion of the main body ledge has two opposing keyholes defined therein;
   wherein the lower wall of the cap has two opposing outwardly projecting keys with a space defined between a top surface of each key and the bottom surface of the cap flange; and
   wherein the cap is mounted to the main body by aligning each key with a corresponding keyhole, inserting each key into its corresponding keyhole, and rotating the cap such that at least a portion of the main body ledge is sandwiched between each key and the bottom surface of the cap flange.

3. The blender of claim 2, wherein the top surface of each key has a slope corresponding to a slope of corresponding portions of a bottom surface of the portion of the main body ledge.

4. The blender of claim 1, wherein the bottom surface of the cap flange and the top surface of the peripheral portion of the main body ledge are each generally horizontal.

5. The blender of claim 1, wherein the main body further comprises a wall extending downward from the main body ledge.

* * * * *